United States Patent
Arimoto et al.

(10) Patent No.: US 10,541,413 B2
(45) Date of Patent: Jan. 21, 2020

(54) DRYING PROCEDURE IN MANUFACTURING PROCESS FOR CATHODE MATERIAL

(71) Applicant: Tesla, Inc., Palo Alto, CA (US)

(72) Inventors: Shinji Arimoto, San Jose, CA (US); Kunio Tsuruta, Mountain View, CA (US); Rene Leblanc, Milpitas, CA (US); Ryan Melsert, Reno, NV (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 15/095,954

(22) Filed: Apr. 11, 2016

(65) Prior Publication Data

US 2017/0294652 A1  Oct. 12, 2017

(51) Int. Cl.
| | |
|---|---|
| *H01M 4/525* | (2010.01) |
| *C01G 53/00* | (2006.01) |
| *H01M 4/505* | (2010.01) |
| *H01M 10/0525* | (2010.01) |
| *H01M 4/02* | (2006.01) |

(52) U.S. Cl.
CPC ............ *H01M 4/525* (2013.01); *C01G 53/42* (2013.01); *C01G 53/44* (2013.01); *H01M 4/505* (2013.01); *C01P 2006/40* (2013.01); *H01M 10/0525* (2013.01); *H01M 2004/028* (2013.01)

(58) Field of Classification Search
CPC .. H01M 4/525; H01M 4/505; H01M 10/0525; C01G 53/42; C01G 53/44
See application file for complete search history.

(56) References Cited

U.S. PATENT DOCUMENTS

| | | | | |
|---|---|---|---|---|
| 5,989,314 | A * | 11/1999 | Schaub .............. | B01D 53/0407 95/119 |
| 2012/0119167 | A1* | 5/2012 | Matsumoto ............ | C01G 53/42 252/519.15 |
| 2013/0078520 | A1* | 3/2013 | Toya ...................... | C01G 53/00 429/223 |
| 2015/0093580 | A1* | 4/2015 | Kobayashi ............ | H01M 4/131 428/403 |

FOREIGN PATENT DOCUMENTS

| | | |
|---|---|---|
| JP | 2003017054 A * | 1/2003 |
| JP | 2006-127955 | 5/2006 |
| WO | WO 20110121691 | 10/2011 |

OTHER PUBLICATIONS

JP 2003017054 (machine translation).*
International Searching Authority; International Search Report and Written Opinion; International Application No. PCT/US2017/026306; dated May 11, 2017; 14 pgs.

* cited by examiner

*Primary Examiner* — James A Fiorito
(74) *Attorney, Agent, or Firm* — Knobbe, Martens, Olson & Bear, LLP

(57) ABSTRACT

A method of manufacturing a cathode material for a lithium ion cell comprises: generating a lithium nickel composite oxide material in a manufacturing process, wherein the manufacturing process results in residual lithium being present in the lithium nickel composite oxide material; washing the lithium nickel composite oxide material to remove at least part of the residual lithium, wherein the washing provides the lithium nickel composite oxide material with a moisture content; and drying the lithium nickel composite oxide material to remove at least part of the moisture content, the drying performed in an environment of substantially only an inert gas or air essentially free of carbon dioxide.

12 Claims, 3 Drawing Sheets

DRYING PROCEDURE IN MANUFACTURING PROCESS FOR CATHODE MATERIAL

BACKGROUND

Of the various types of electrochemical energy storage systems, the lithium ion cell is currently the most commonly used for powering vehicles as well as portable electronic devices. For example, battery electric vehicles can use one or more battery packs containing cells having a cylindrical or other shape. In general, a lithium ion cell includes a cathode material and an anode material with a separator between them, and an electrolyte that facilitates the electrochemical processes involved in charging and discharging the cell.

In some lithium ion cells, the cathode material is made using a lithium nickel cobalt aluminum oxide. For example, this material can be manufactured by mixing a lithium salt with a precursor material, and baking the mixture so that it becomes a powder. This material will ultimately be formed into the desired shape of the cathode, such as a sheet. The formed lithium nickel cobalt aluminum oxide is relatively sensitive after the baking. For example, residual lithium can be present in form of lithium carbonate or lithium hydroxide. Significant residual lithium remaining in the cathode material after the cell is assembled can be detrimental to cell life. For this purpose, a washing step has been introduced into the manufacturing process. The washing can stabilize the lithium nickel cobalt aluminum oxide by forming a nickel oxyhydroxide surface on the particles.

After the washing, the material should be dried to reduce its moisture level. The drying process can include a low temperature stage and a high temperature stage followed by a cooling period. To ensure a clean environment during the drying process, it is currently performed using an evacuated chamber. Because of the vacuum, there is little or no heat conduction. Rather, the heat transfer occurs by contact between the particles and the inside surface of the chamber. However, the process can take a long time due to the lack of thermal convection and the need to heat or cool the chamber between different drying stages, sometimes 12-24 hours for a typical batch. Also, to ensure homogeneous drying of the material, the material can be mechanically mixed or agitated in the chamber during the process. However, such mixing/agitation can pose a risk of metallic contamination in the material, which could cause defects in the lithium ion battery.

SUMMARY

In an aspect, a method of manufacturing a cathode material for a lithium ion cell comprises: generating a lithium nickel composite oxide material in a manufacturing process, wherein the manufacturing process results in residual lithium being present in the lithium nickel composite oxide material; washing the lithium nickel composite oxide material to remove at least part of the residual lithium, wherein the washing provides the lithium nickel composite oxide material with a moisture content; and drying the lithium nickel composite oxide material to remove at least part of the moisture content, the drying performed in an environment of substantially only an inert gas or air essentially free of carbon dioxide.

Implementations can include any or all of the following features. The method further comprises creating the environment for drying the lithium nickel composite oxide material by introducing the inert gas into a chamber and reducing a carbon dioxide level in the chamber to at most about 100 ppm. The carbon dioxide level in the chamber is reduced to at most about 50 ppm. The method further comprises detecting the carbon dioxide level in the chamber and removing carbon dioxide from the chamber accordingly. Removing the carbon dioxide from the chamber comprises applying a pressure swing adsorption process. The inert gas or the air essentially free of carbon dioxide provides thermal convection in removing at least part of the moisture content. The chamber comprises a rotary kiln. The chamber comprises a fluid bed dryer. The drying comprises a continuous process performed in a single chamber. The drying comprises a step-separate process performed in chambers that are kept at different temperatures. The drying comprises: (i) a first drying stage performed at a first temperature, (ii) after the first stage, a second drying stage performed at a second temperature higher than the first temperature, and (iii) after the second stage, a third stage of cooling the lithium nickel composite oxide material. Each of the first, second and third stages is performed in a separate chamber. The lithium nickel composite oxide material comprises a lithium nickel cobalt aluminum oxide or a lithium nickel cobalt manganese oxide. The drying is performed in the inert gas, and wherein the inert gas comprises at least one of nitrogen and argon. The drying is performed in the air essentially free of carbon dioxide, the method further comprising performing air filtering to remove the carbon dioxide.

DETAILED DESCRIPTION

This document describes examples of systems and techniques for improving the manufacturing of a cathode material in the electrode preparation for lithium ion cells. Examples described herein describe that the disadvantages relating to vacuum dryers can be overcome by using a dryer where the material is dried in the presence of an inert gas or air that has been filtered to remove carbon dioxide. Such gas/air can then be provided at about normal pressure, such as at one atm. For example, this can shorten the drying process significantly and/or can increase the production efficiency.

Figure 1:
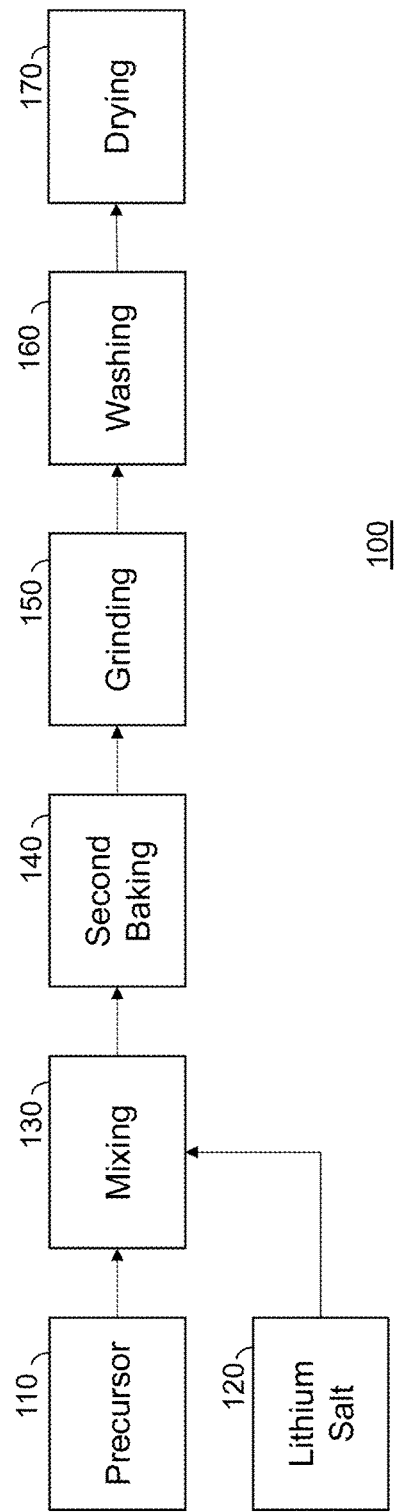
FIG. 1 shows a process flow of an example of manufacturing a cathode material for a lithium ion cell.

FIG. 1 shows a process flow 100 of an example of manufacturing a cathode material for a lithium ion cell. A precursor 110 and a lithium salt 120 can be mixed together at a mixing stage 130. In some implementations, the precursor can include a nickel hydroxide or a nickel oxide, and the lithium salt can include lithium hydroxide. For example, the materials 110 and 120 can be in powder form before the mixing, and other components, such as a doping or coating material, can be included.

A baking stage 140 is here referred to as a second baking. In some implementations, this signifies that another baking stage occurs earlier in the manufacturing process. For example, the precursor material and/or the lithium salt can result from an earlier baking stage.

After the baking stage, the material is subjected to a grinding stage 150. For example, the baked material can be ground to powder form. In some implementations, the result of the grinding is a powder that in principle is the proper material for manufacturing the cathode, except that residual lithium is present in the powder. For example, the material can be a lithium nickel composite oxide material, such as lithium nickel cobalt aluminum oxide or lithium nickel cobalt manganese oxide. The residual lithium can be lithium carbonate or lithium hydroxide, to name two examples. As such, a lithium nickel composite oxide material can be generated in a manufacturing process, and this manufacturing process results in some residual lithium being present in the material.

The material can therefore be washed in a washing stage 160. In some implementations, the material is mixed with water and a solvent to remove at least some of the residual lithium. A fluid removal can be performed after the washing. In some implementations, a filter press can be used. For example, after the washing stage the material can have a moisture content of about 10-20%, and the filter press can reduce this to about 5% moisture.

The stages 110-160 described above can be implemented in various ways, including those that are known to people of skill in the art.

A drying stage 170 that follows after the above stages, on the other hand, is an improved way of further reducing the moisture level in the created material. According to this stage, drying of the lithium nickel composite oxide material is performed in an environment of substantially only an inert gas or air essentially free of carbon dioxide. This contrasts, for example, with the existing approach of drying the material in a vacuum, in that the stage 170 provides useful heat convection through the gas/air. For example, and without limitation, an inert gas can include nitrogen, argon, or combinations thereof. Moreover, if sufficient heat convection is provided, there may be little or no need to agitate the powder material inside the drying chamber or other vessel.

The process flow 100 can be performed in any of various types of systems implemented for manufacturing of lithium ion cells. Such systems will then have respective components or subsystems for containing and transporting the materials 110 and 120, for mixing them together at 130, for baking them at 140 and grinding the baked material at 150, and for washing the material at 160 and drying it at 170. Examples of system components that can perform the washing and drying stages will now be described.

Figure 2:
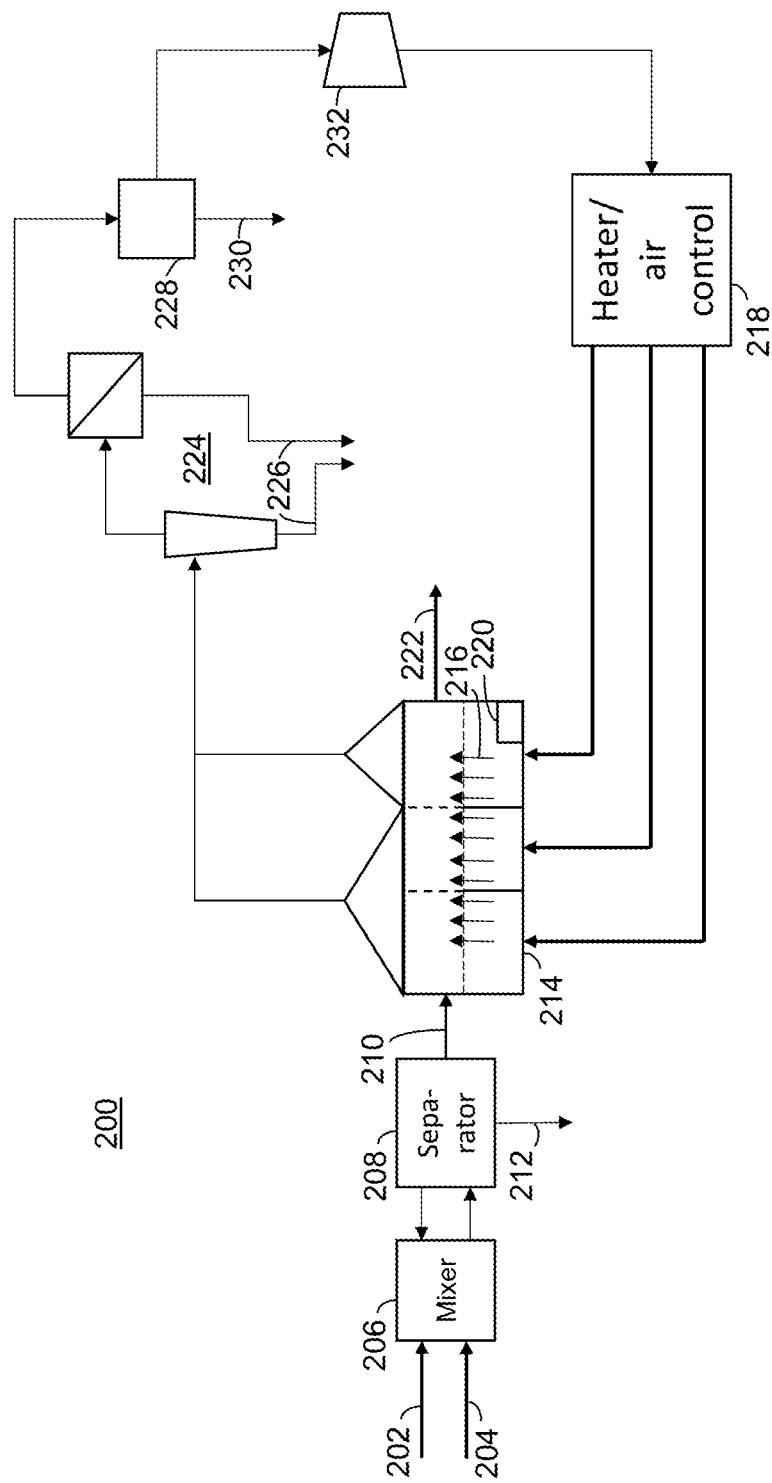
FIG. 2 shows an example of a system flow relating to the washing stage and the drying stage in the process flow of FIG. 1.

FIG. 2 shows an example of a system flow 200 relating to the washing stage and the drying stage in the process flow of FIG. 1. Some aspects of FIG. 1 will here be mentioned solely for purposes of illustration. Active material 202 is produced by a baking process. In some implementations, the baking stage 140 and the grinding stage 150 can generate the active material. For example, the active material includes lithium nickel composite oxide. Moreover, a solvent 204 is provided. In some implementations, water can be used as a solvent. In some implementations, an organic solvent can be used, including, but not limited to, n-methyl pyrrolidone.

The active material 202 and the solvent 204 are introduced into a mixer 206. This allows the solvent to separate residual lithium from the active material. The residual lithium in the active material can be in form of a salt, such as lithium carbonate and/or lithium hydroxide. A separator 208 operates in conjunction with the mixer to generate washed material 210 and solvent 212 that contains residual material.

The washed material 210 is introduced into a dryer 214. In some implementations, this can include a fluidizing dryer such as a fluid bed dryer. The fluidizing dryer can have one or more perforated surfaces on which the material sits, and a cushion of air or gas 216 can then be supplied to flow through the bed of material.

The drying can be performed in zones according to different temperatures. A zoned dryer can be used, such as a zoned fluidizing dryer, a zoned rotary kiln or separate rotary kilns, to name just a few examples. In some implementations, the drying comprises a first drying stage performed at a first temperature, such as about 60-110° C. For example, the first stage can reduce the moisture content from about 5% to about 1%. After the first stage, the drying can comprise a second drying stage performed at a second temperature higher than the first temperature, such as about 200° C. For example, the second stage can reduce the moisture content to lower than about 1%. After the heated drying, the lithium nickel composite oxide material can be subjected to a third stage of cooling, such as at about room temperature.

A heater/air control 218 can be provided for the dryer. In some implementations, the control provides an inert gas to be used in drying the active material. For example, and without limitation, nitrogen or argon can be used. The control 218 can provide separate streams of gas/air to each of multiple separate zones or chambers that are used in the drying. For example, the first zone can receive gas/air at a first temperature, the second zone can receive gas/air at a second temperature higher than the first temperature, and the third zone can receive gas/air at about ambient temperature, such as room temperature.

In some implementations, the heater/air control can perform filtering of ambient air before such air is introduced into the dryer. Carbon dioxide can be filtered out to purify the air, including, but not limited to, that the carbon dioxide level in the chamber can be reduced to at most about 100 ppm, in some implementations to at most about 50 ppm. As such, the stage performed by the dryer 214 can be performed in an environment of substantially only an inert gas or air essentially free of carbon dioxide.

In some implementations, the carbon dioxide level in the chamber can be monitored. For example, a pressure swing adsorption system 220 can be provided that monitors the level of carbon dioxide in the gas/air and removes carbon dioxide from the chamber accordingly. Such a system is known in the art and can use an adsorptive material such as zeolite, for example. The pressure swing adsorption system can be located inside the drying chamber or elsewhere in the circulation system.

A finished product 222 is obtained from the dryer 214. For example, this includes a lithium nickel composite oxide material having a sufficiently low level of moisture content. Additional processes, such as sieving and magnetic separation and generation of slurry, can be performed thereafter, as is known to those skilled in the art.

A subsystem 224 performs particle removal from vapors that are extracted from the dryer 214. For example, this can produce fine product 226 that can be added to the finished product 222 or used for another purpose. A dehumidifier 228 removes moisture from the output of the subsystem 224. As such, a moisture stream 230 can be generated. The system can include one or more fans or blowers 232. For example, such component(s) can provide the fluid with a sufficient flow to pass through the mass of material in the dryer and to circulate in the rest of the system.

Figure 3A:
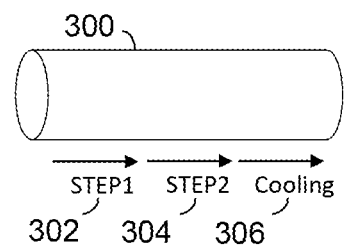
FIGS. 3A-B schematically show examples of processing using rotary kilns.
Figure 3B:
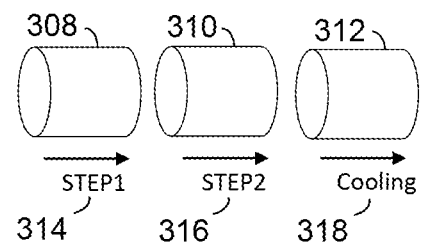

FIGS. 3A-B schematically show examples of processing using rotary kilns. In FIG. 3A, a rotary kiln 300 is used to illustrate a continuous drying process. The active material is introduced into the kiln at one end (e.g., the left side in this illustration). For example, this can be done using a conveyor system whose other end receives the material after a washing process. In the continuous process, the active material is first subjected to a step 302 that can involve drying the material at a temperature that is sufficiently low so as to not accelerate a reaction that increases the presence of nickel oxyhydroxide (e.g., up to about 60-110° C.). The material can then be subjected to a step 304 that can involve drying the material at a temperature that is higher than in the step 302, but sufficiently low to not cause nickel oxyhydroxide to change into nickel oxide (e.g., up to about 200° C.). The material can then be subjected to a step 306 that can involve cooling the material down to about room temperature. As such, the rotary kiln 300 can be used in a continuous process of drying the active material in a single chamber, which can improve the production efficiency above an existing batch process. For example, each zone of the kiln 300 can have its target temperature the whole time, so there is no need to wait for a zone to warm up or cool down before a next step can begin.

In FIG. 3B, rotary kilns 308-312 are used to illustrate a step-separation drying process. The active material can be introduced into the kiln 308 using a conveyor system, for example as described above. In the kiln 308, the material can be subjected to drying at the first temperature mentioned above, corresponding to a drying step 314. The material can then be transported from the kiln 308 to the kiln 310, for example using a conveyor system. In the kiln 310, the material can be subjected to drying at the second temperature mentioned above, corresponding to a drying step 316. The material is then transported to the kiln 312 (or to any other vessel or storage location) for cooling, corresponding to a cooling step 318. As such, the kilns 308-312 can be used in a step-separate process that can likewise improve the production efficiency. For example, each of the kilns can have its target temperature the whole time, so there is no need to wait for a kiln to warm up or cool down.

A number of implementations have been described as examples. Nevertheless, other implementations are covered by the following claims.

What is claimed is:

1. A method of manufacturing a cathode material for a lithium ion cell, the method comprising:
    generating a lithium nickel composite oxide material in a manufacturing process, wherein the manufacturing process results in residual lithium being present in the lithium nickel composite oxide material, including:
        mixing a precursor and a lithium salt in a mixing stage to produce a mixture;
        baking the mixture; and
        grinding the baked mixture to produce the lithium nickel composite oxide material;
    washing the lithium nickel composite oxide material to remove at least part of the residual lithium, wherein the washing provides the lithium nickel composite oxide material with a moisture content; and
    drying the lithium nickel composite oxide material in a continuous process to remove at least part of the moisture content, the drying performed in a single chamber including a first dryer zone, a second dryer zone, and a third dryer zone, the single chamber having an environment of substantially only an inert gas or air essentially free of carbon dioxide,
    wherein drying the lithium nickel composite oxide material comprises:
        a first drying stage that includes drying the lithium nickel composite oxide material in the first drying zone at a first temperature;
        a second drying stage that includes drying the lithium nickel composite oxide material in the second drying zone at a second temperature, wherein the second temperature is higher than the first temperature and the lithium nickel composite oxide material passed directly from the first drying zone to the second drying zone; and
        a cooling stage that includes cooling the lithium nickel composite oxide material in the third drying zone, wherein a separate stream of inert gas or air essentially free of carbon dioxide is introduced into each of the first dryer zone, the second dryer zone, and the third dryer zone.

2. The method of claim 1, wherein introducing a separate stream of gas or air into each of the first dryer zone, the second dryer zone, and the third dryer zone results in a respective carbon dioxide level in the first dryer zone, the second dryer zone, and the third dryer zone of at most about 100 ppm.

3. The method of claim 1, wherein introducing a separate stream of gas or air into each of the first dryer zone, the second or second dryer zone, and the third dryer zone results in a respective carbon dioxide level in the first dryer zone, the second dryer zone, and the third dryer zone of at most about 50 ppm.

4. The method of claim 2, further comprising:
    detecting an unacceptable level of carbon dioxide in at least one of the first dryer zone, the second dryer zone, or the third dryer zone; and
    in response to detecting the unacceptable level of carbon dioxide, utilizing a gas separation process internal to the at least one of the first dryer zone, the second dryer zone, or the third dryer zone, to reduce the unacceptable level of carbon dioxide.

5. The method of claim 4, wherein the gas separation process comprises a pressure swing adsorption process.

6. The method of claim 1, wherein the separate stream of inert gas or air essentially free of carbon dioxide introduced into the first dryer zone and the separate stream of inert gas or air essentially free of carbon dioxide introduced into the second dryer zone are heated to provide thermal convection in removing at least part of the moisture content.

7. The method of claim 6, wherein the single chamber comprises a rotary kiln.

8. The method of claim 6, wherein the single chamber comprises a zoned fluidizing dryer.

9. The method of claim 1, wherein the cooling stage further includes passing the lithium nickel composite oxide material directly from the second dryer zone to the third dryer zone.

10. The method of claim 1, wherein the lithium nickel composite oxide material comprises a lithium nickel cobalt aluminum oxide or a lithium nickel cobalt manganese oxide.

11. The method of claim 1, wherein the first drying stage, the second drying stage, and the cooling stage are performed in the inert gas, and wherein the inert gas comprises at least one of nitrogen and argon.

12. The method of claim 1, wherein the first drying stage, the second drying stage, and the cooling stage are performed in the air essentially free of carbon dioxide, the method further comprising performing air filtering to remove carbon dioxide from the air.

\* \* \* \* \*